(12) United States Patent
Zarelius

(10) Patent No.: US 8,807,193 B2
(45) Date of Patent: *Aug. 19, 2014

(54) COLLAPSIBLE, FLEXIBLE DISPLAY SYSTEM

(75) Inventor: Christer Zarelius, Stockholm (SE)

(73) Assignee: Expand International AB, Johanneshov (SE)

(*) Notice: Subject to any disclaimer, the term of this patent is extended or adjusted under 35 U.S.C. 154(b) by 0 days.

This patent is subject to a terminal disclaimer.

(21) Appl. No.: 13/696,129
(22) PCT Filed: Feb. 13, 2012
(86) PCT No.: PCT/SE2012/050143
§ 371 (c)(1), (2), (4) Date: Nov. 5, 2012
(87) PCT Pub. No.: WO2012/115570
PCT Pub. Date: Aug. 30, 2012

(65) Prior Publication Data
US 2013/0327731 A1 Dec. 12, 2013

Related U.S. Application Data
(60) Provisional application No. 61/447,521, filed on Feb. 28, 2011.

(30) Foreign Application Priority Data
Feb. 25, 2011 (SE) .................................... 1100134

(51) Int. Cl.
A47G 5/00 (2006.01)
(52) U.S. Cl.
USPC ............................ 160/135; 40/610; 248/200.1
(58) Field of Classification Search
CPC ... G09F 15/0068; G09F 15/0062; G09F 7/04; A47B 47/0025; A47B 47/0041; A47F 7/0042; A47F 5/132; A47F 5/13; A47H 23/01; A47G 5/00; A47G 5/02
USPC ................. 211/180, 189, 195, 204, 206, 182; 248/165, 200.1, 206.5; 40/600, 605, 40/610, 661.01; 160/24, 120, 135, 180, 160/263, 349.1

See application file for complete search history.

(56) References Cited

U.S. PATENT DOCUMENTS 3,605,851 A  9/1971  Miles
3,827,019 A  7/1974  Serbu
(Continued)

FOREIGN PATENT DOCUMENTS

| DE | 4036221 A1 * | 5/1992 | ................ A47F 1/08 |
| SE | 469 404 | 6/1993 | |
| SE | 529 576 | 9/2007 | |

OTHER PUBLICATIONS

Office Action dated May 31, 2013 from counterpart U.S. Appl. No. 13/667,602 (10 pages).

Primary Examiner — Joshua Rodden
Assistant Examiner — Stanton L Krycinski
(74) Attorney, Agent, or Firm — Drinker Biddle & Reath LLP

(57) ABSTRACT

A collapsible, flexible display system for creating different spatial shapes of a continuous screen includes at least two stands, each including a first part which support against an underlying supportive surface and a pole with a first end removably secured in the first part by a second coupling and a second end provided with a first coupling. The display system also includes essentially hollow, straight members of a rigid material including first and second end parts, and essentially hollow, bendable members of a flexible material including first and second end parts. Each end part includes either a male part, or a female part, at least one of them of a magnetic material, and operable to magnetically fasten to each other. Straight members and bendable members are connected to each other to form an upper part and a lower part. The display system is mounted an upper edge welt including the upper part fastened in a number, n, of first couplings, and a lower edge welt including the lower part fastened in the number, n, of second couplings.

13 Claims, 5 Drawing Sheets

(56) References Cited

U.S. PATENT DOCUMENTS

| | | | | |
|---|---|---|---|---|
| 3,875,711 | A * | 4/1975 | Palmer | 52/239 |
| 6,681,532 | B1 | 1/2004 | Palmbos et al. | |
| 6,718,669 | B1 * | 4/2004 | Hayes | 40/610 |
| 6,836,988 | B2 | 1/2005 | Zarelius | |
| 6,938,863 | B2 * | 9/2005 | LaMotte | 248/165 |
| 7,185,861 | B2 * | 3/2007 | LaMotte | 248/165 |
| 7,237,350 | B1 | 7/2007 | Zarelius | |
| 7,337,567 | B2 * | 3/2008 | Fritsche et al. | 40/603 |
| 7,963,059 | B2 * | 6/2011 | Fritsche et al. | 40/603 |
| 8,028,449 | B2 * | 10/2011 | Zarelius | 40/610 |
| 8,272,156 | B2 * | 9/2012 | Gimpel et al. | 40/604 |
| 8,458,937 | B2 * | 6/2013 | Fritsche et al. | 40/603 |
| 8,549,778 | B2 * | 10/2013 | Ahlberg | 40/603 |
| 2004/0006902 | A1 * | 1/2004 | Zarelius | 40/600 |
| 2004/0159753 | A1 * | 8/2004 | LaMotte | 248/165 |
| 2005/0166430 | A1 | 8/2005 | Zarelius | |
| 2008/0005945 | A1 * | 1/2008 | Fritsche et al. | 40/603 |
| 2008/0040961 | A1 * | 2/2008 | Hwang et al. | 40/610 |
| 2008/0105797 | A1 * | 5/2008 | Fritsche et al. | 248/161 |
| 2009/0056184 | A1 * | 3/2009 | Fritsche et al. | 40/604 |
| 2010/0146832 | A1 * | 6/2010 | Gimpel et al. | 40/604 |
| 2011/0302813 | A1 * | 12/2011 | Zarelius | 40/600 |
| 2012/0073172 | A1 * | 3/2012 | Fritsche et al. | 40/604 |
| 2012/0216437 | A1 * | 8/2012 | Ahlberg | 40/603 |
| 2012/0216438 | A1 * | 8/2012 | Harris | 40/604 |
| 2012/0297651 | A1 * | 11/2012 | Harris | 40/604 |

* cited by examiner

COLLAPSIBLE, FLEXIBLE DISPLAY SYSTEM

FIELD OF THE INVENTION

The present invention relates according to a first aspect to a collapsible, flexible display system.

According to a second aspect the present invention relates to an alternative collapsible, flexible display system.

BACKGROUND OF THE INVENTION

The patent document SE 529 576 C2 relates to a display system which uses a magnetic coupling or a screw/thread coupling in order to connect different tubes horizontally. The display system uses metal tubes which only can be connected in a radial plane with the aid of guide traces in the coupling area. The display system uses both straight and curved tubes, but they are both of a rigid material, in order to create curved shapes for suspending a screen.

A main disadvantage with this solution is that it is difficult to assemble in that it comprises a lot of different parts. It is especially difficult for one person to assemble a display system according to the above presented solution. Furthermore, the display system according this solution can only have predetermined shapes. Another advantage is that the display system will be rather heavy due to all metal tubes.

SUMMARY OF THE INVENTION

The above mentioned problems are solved with a collapsible, flexible display system as described herein. The display system is operable to create different spatial shapes of a continuous screen. The display system comprising at least two stands, each stand comprising a first part which support against an underlying supportive surface, wherein the stand also comprises a pole means, with a first end removably secured in the first part, and a second end provided with a first coupling means. The display system also comprises essentially hollow, straight members of a rigid material, each member comprises a first end part, and a second end part, and essentially hollow, bendable members of a flexible material, each member comprises a first end part, and a second end part. Each end part comprises either a male part, or a female part, at least one of them of a magnetic material, and operable to magnetically fasten to each other. Different members are connected to each other in order to form an upper part, and a lower part, both comprising the same type of members. If an end part of a bendable member comprises a female part, or a male part of a magnetic material, the end part comprises a sleeve means arranged between the end part, and the female part, or the male part. The screen comprises an upper edge welt, and a lower edge welt adapted to receive the upper part respectively the lower part. Each pole means is provided with a second coupling means arranged in connection to the first end. When the display system is mounted, the upper edge welt comprising the upper part are fastened in a number, n, of first coupling means, and the lower edge welt comprising the lower part are fastened in the number, n, of the second coupling means.

A main advantage with this solution is that it is very easy to assemble the display system. It is even possible for only one person to assemble the display system without having to use a ladder. Another very important advantage is that this solution offers more freedom in creating different spatial shapes of a continuous screen. Another advantage is that it is possible to decrease the weight of the display system, which is of importance when transporting a disassembled display system.

The above mentioned problems are also solved with a collapsible, flexible display system according to another embodiment described herein. The display system is operable to create different spatial shapes of a continuous screen. The display system comprises at least two stands, each stand comprising a first part which support against an underlying supportive surface, wherein the stand also comprises a pole means, with a first end removably secured in the first part, and a second end provided with a first coupling means. The display system comprises at least two essentially rectangular first screens, each first screen comprising two essentially hollow, straight members of a rigid material, one arranged in connection with a first short end of the first screen, and the other arranged in connection with a second short end of the first screen. Each member comprises a first end part, and a second end part. Each first screen comprises a first magnetic strip means arranged in connection with a first longitudinal end of the first screen, and a second magnetic strip means arranged in connection with a second longitudinal end of the first screen. Furthermore, the display system also comprises at least one essentially rectangular second screen, each second screen comprises two essentially hollow, bendable members of a flexible material, one arranged in connection with a first short end of the second screen, and the other arranged in connection with a second short end of the second screen. Each member comprises a first end part, and a second end part. Each second screen comprises a first magnetic strip means arranged in connection with a first longitudinal end of the second screen, and a second magnetic strip means arranged in connection with a second longitudinal end of the second screen. Each end part comprises either a male part, or a female part, at least one of them of a magnetic material. The different screens are connected to each other by the members being connected to each other magnetically, and the magnetic strip means being connected to each other magnetically. The members are connected to the first coupling means, and to second coupling means arranged in connection to the first end of each pole means, thus creating a continuous screen.

A main advantage with this solution is that it is very easy to assemble the display system. It is even possible for only one person to assemble the display system without having to use a ladder. Another very important advantage is that this solution offers more freedom in creating different spatial shapes of a continuous screen. Another advantage is that it is possible to decrease the weight of the display system, which is of importance when transporting a disassembled display system.

A further advantage in this context is achieved if at least one of the bendable members has the first end part, and the second end part provided with a female part, at least one of them being of magnetic material.

Furthermore, it is an advantage in this context if at least one of the bendable members has the first end part provided with a female part, and the second end part provided with a male part, wherein at least one of the female part and the male part being of magnetic material.

A further advantage in this context is achieved if at least one of the bendable members has the first end part, and the second end part provided with a male part, at least one of them being of magnetic material.

Furthermore, it is an advantage in this context if at least one of the bendable members have at least one spring means arranged in connection to the male part and/or female part, inside the bendable member.

A further advantage in this context is achieved if at least one of the straight members has the first end, and the second end provided with a female part, at least one of them being of a ferromagnetic material.

Furthermore, it is an advantage in this context if at least one of the straight members has the first end part provided with a female part, and the second end part provided with a male part, wherein at least one of the female part and the male part being of a ferromagnetic material.

A further advantage in this context is achieved if at least one of the straight members has the first end part, and the second end part provided with a male part, at least one of them being of ferromagnetic material.

Furthermore, it is an advantage in this context if each of the bendable members is made of rubber.

A further advantage in this context is achieved if each of the straight members is made of aluminum.

Furthermore, it is an advantage in this context if the members have a circular cross section.

According to another alternative, it is an advantage if the members have an elliptical cross section.

It will be noted that the term "comprises/comprising" as used in this description is intended to denote the presence of a given characteristic, step, or component, without excluding the presence of one or more other characteristics, features, integers, steps, components, or groups thereof.

Embodiments of the invention will now be described with a reference to the accompanying drawings, in which:

DETAILED DESCRIPTION OF PREFERRED EMBODIMENTS

Figure 1:
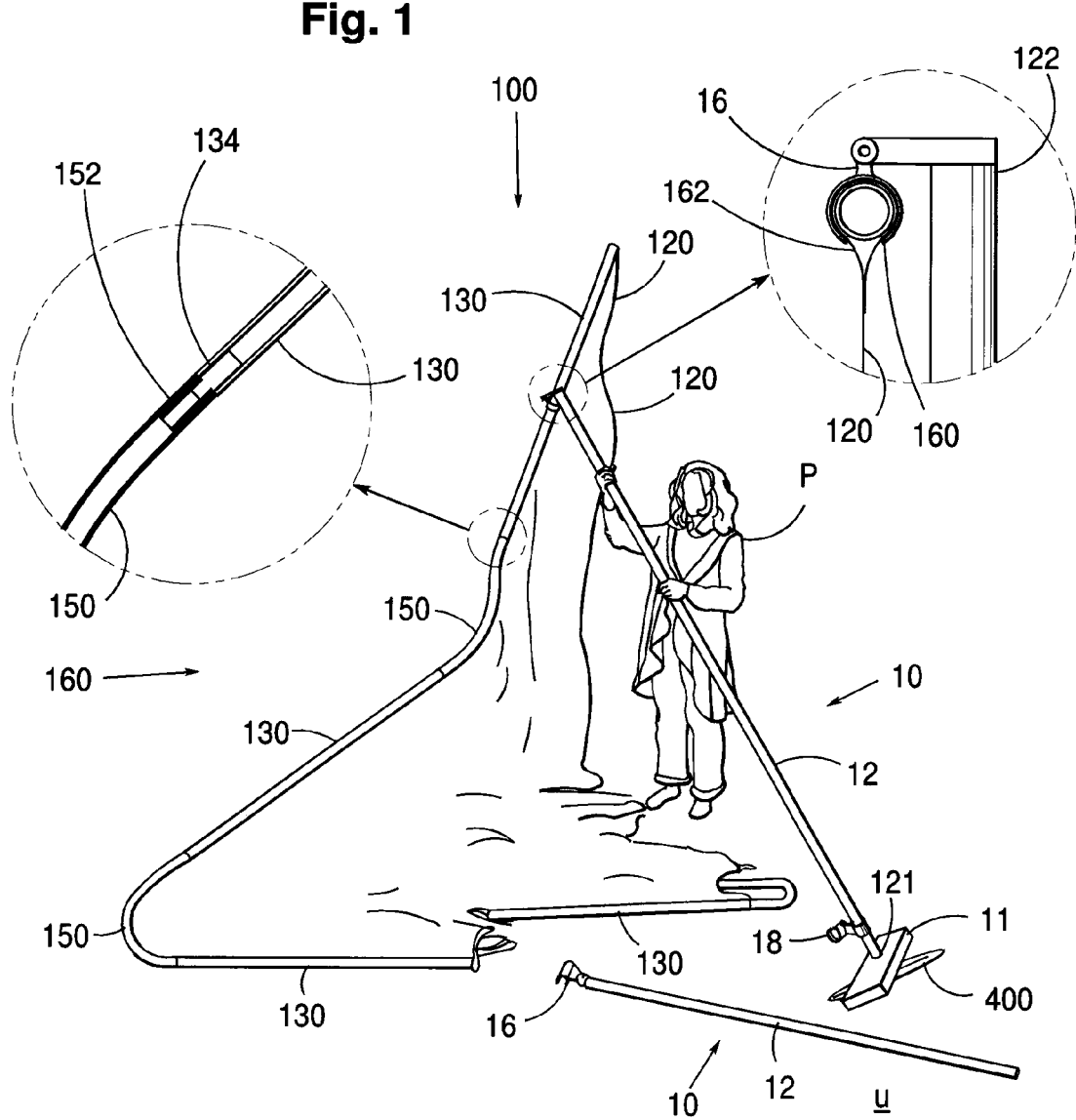
FIG. 1 discloses a perspective view of the assembling of a first embodiment of a collapsible, flexible display system according to the present invention.

In FIG. 1 there is disclosed a perspective view of the assembling of a first embodiment of a collapsible, flexible display system 100 according to the present invention. The display system 100 comprises at least two stands 10, each stand 10 comprising a first part 11 which support against an underlying supportive surface (u). Furthermore, the stand 10 also comprises a pole means 12, with a first end 121 removably secured in the first part 11, and a second end 122 provided with a first coupling means 16. As is apparent in FIG. 1, one stand 10 has been used for assembling the display system 100 so far, while the other disclosed stand 10 is lying on the surface (u), e.g., the floor. In order to increase the stability of the display system 100, the first part 11 can be provided with two feet 400, as is apparent in FIG. 1. The display system 100 also comprises essentially hollow, straight members 130 of a rigid material, e.g., aluminum. Each member 130 comprises a first end part 132 (not disclosed in FIG. 1), and a second end part 134. Furthermore, the display system 100 also comprises essentially hollow, bendable members 150 of a flexible material, e.g., rubber. Each end part 132, 134, 152, 154 comprises either a male part, or a female part, at least one of them of a magnetic material, and operable to magnetically fasten to each other. This is partly disclosed in the cross section view disclosed in the circle to the left in FIG. 1. As is disclosed in this cross section view, the first end part 152 of the bendable member 150 comprises a female part of magnetic material, and the second end part 134 of the straight member 130 comprises a male part of ferromagnetic material. The different members 130, 150 are connected to each other in order to form an upper part 160, and a lower part 170 (not disclosed in FIG. 1), both comprising the same type of members 130, 150, and in the same order. It is pointed out that a bendable member 150 is always placed between two straight members 130. If an end part 152, 154 of a bendable member 150 comprises a female part, or a male part of a magnetic material, the end part 152, 154 comprises a sleeve means 156 (not disclosed in FIG. 1, but see e.g., FIG. 6) arranged between the end part 152, 154 and the female part, or the male part. It is pointed out that the display system 100 is operable to create different spatial shapes of a continuous screen 120. The screen 120 comprises an upper edge welt 162, and a lower edge welt (not disclosed in FIG. 1) adapted to receive the upper part 160 respectively the lower part 170. The upper edge welt 162 is disclosed in the circle to the right in FIG. 1. As also apparent in FIG. 1, each pole means 12 is provided with a second coupling means 18 arranged in connection to the first end 121. When the display system 100 is mounted/assembled, the upper part 160 is placed in the upper edge welt 162, and thereafter fastened in a number, n, of first coupling means 16. The person P in FIG. 1 is performing this mounting step. The lower edge welt comprising the lower part 170 are fastened in the number, n, of the second coupling means 18. It is pointed out that it is possible for only one person P to assemble the display system 100 according to the present invention, without having to use a ladder. It is pointed out that it is suitable to have a stand 10 for each straight member 130 in order to make the display system 100 stable.

Figure 2:
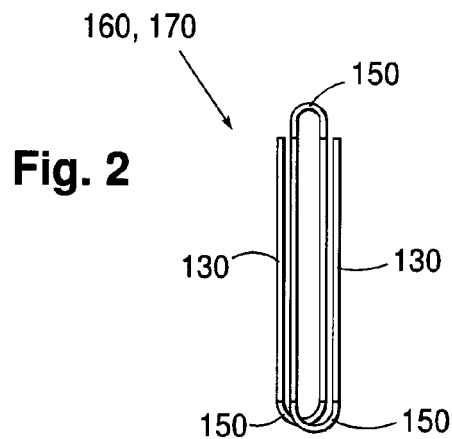
FIG. 2 discloses a perspective view of an upper part, and a lower part of the display system disclosed in FIG. 1.

In FIG. 2 there is disclosed a perspective view of an upper part 160, or a lower part 170 of the display system 100 disclosed in FIG. 1. Due to the fact that the members 150 are bendable it is possible to have the upper part 160, or the lower part 170 mounted and suitable for transport in e.g., a bag. Furthermore, when the upper part 160 is arranged in the disclosed way, it will not occupy much space.

Figure 3:
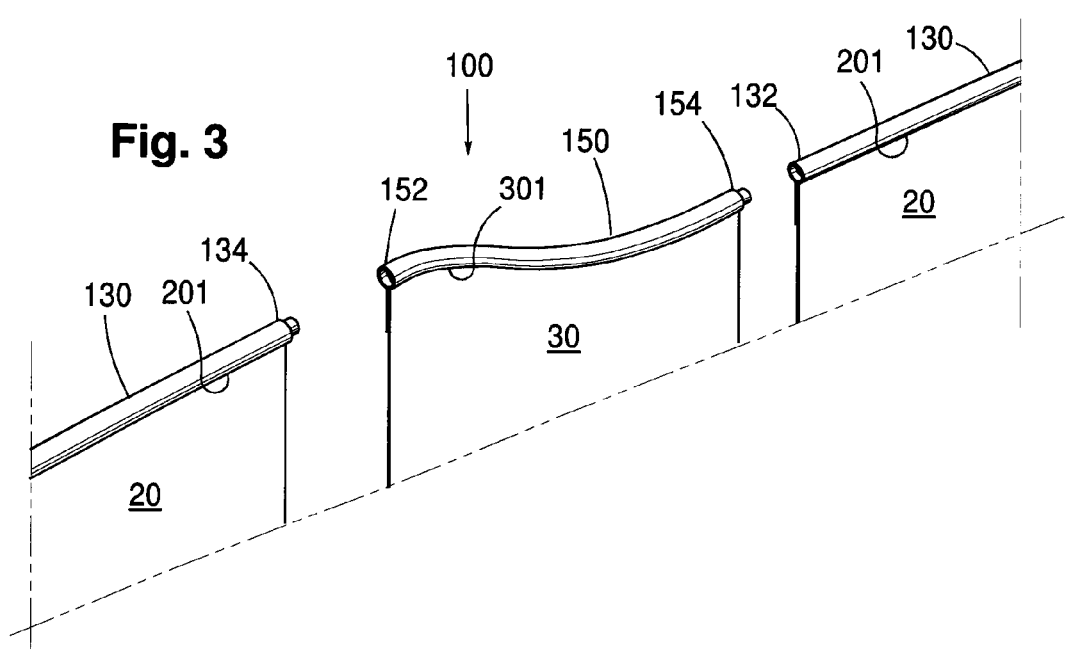
FIG. 3 discloses a perspective view of the assembling of a second embodiment of a collapsible, flexible display system according to the present invention.

In FIG. 3 there is disclosed a perspective view of the assembling of a second embodiment of a collapsible, flexible display system 100 according to the present invention. The display system 100 comprises at least two essentially rectangular first screens 20, and at least one essentially rectangular second screen 30. Each first screen 20 comprises two essentially hollow, straight members 130 of a rigid material, one arranged in connection with a first short end 201 of the first screen 20, and the other arranged in connection with a second short end 203 (not disclosed in FIG. 3, but in FIG. 4) of the first screen 20. Each second screen 30 comprises two essentially hollow, bendable members 150 of a flexible material, one arranged in connection with a first short end 301 of the second screen 30, and the other arranged in connection with a second short end 303 (not disclosed in FIG. 3, but in FIG. 4) of the second screen 30. It is pointed out that in this particular embodiment, the members 130, 150 are fixedly connected to the screens 20, 30. Each member 130 comprises a first end part 132, and a second end part 134, and each member 150 comprises a first end part 152, and a second end part 154. Each end part 132, 134, 152, 154 comprises either a male part, or a female part, at least one of them of a magnetic material. The different screens 20, 30 are connected to each other by the members 130, 150 being connected to each other magnetically.

Figure 4:
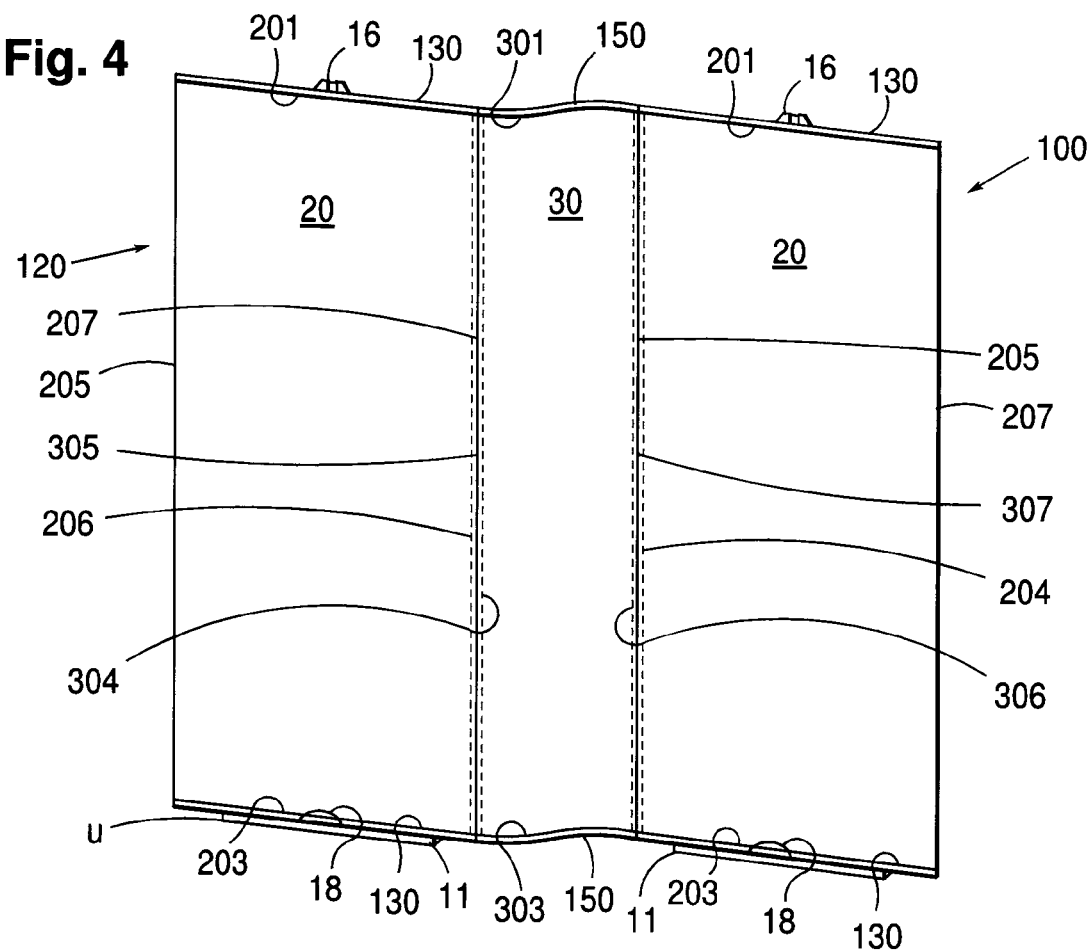
FIG. 4 discloses a side view of the display system disclosed in FIG. 3, when it has been assembled.

In FIG. 4 there is disclosed a side view of the display system 100 disclosed in FIG. 3, when it has been assembled. Each first screen 20 comprises a first magnetic strip means 204 arranged in connection with a first longitudinal end 205 of the first screen 20, and a second magnetic strip means 206 arranged in connection with a second longitudinal end 207 of the first screen 20. Each second screen 30 comprises a first magnetic strip means 304 arranged in connection with a first longitudinal end 305 of the second screen 30, and a second magnetic strip means 306 arranged in connection with a second longitudinal end 307 of the second screen 30. Besides that the male parts and female parts of the members 130, 150 are connected to each other magnetically, the magnetic strip means 204, 206, 304, 306 are connected to each other magnetically, as is disclosed in FIG. 4. Furthermore, the display system 100 also comprises at least two stands 10 (see FIG. 1), each stand 10 comprising a first part 11 in the same way as disclosed and described in connection with FIG. 1. Each member 130 is coupled to a first coupling means 16, here disclosed in the form of a hook means 16, but the coupling means 16 can be of the type disclosed in FIG. 1. Furthermore, each lower member 170 is coupled to a second coupling means 18 arranged in connection to the first end 121 of each pole means 12 (see e.g., FIG. 1), creating a continuous screen 120.

Figure 5:
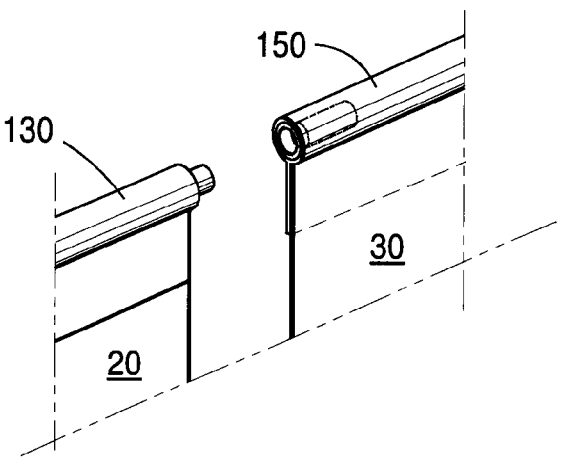
FIG. 5 discloses a perspective view in more detail of some parts of the display system disclosed in FIG. 4.
Figure 6:
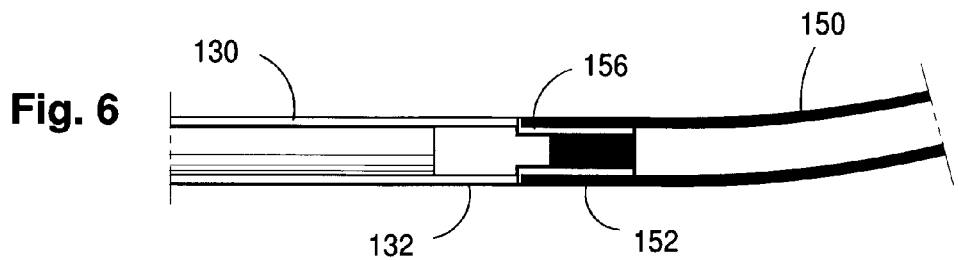
FIG. 6 is a cross section view of the parts disclosed in FIG. 5, when they have been connected.

In FIGS. 5, and 6 there is disclosed a perspective view in more detail and a cross section view of some parts of the display system 100 disclosed in FIG. 4. In FIG. 5 there is disclosed a first screen 20 with a straight member 130, and a second screen 30 with a bendable member 150. In this particular embodiment, the first end part 132 (see FIG. 6) comprises a male part of a ferromagnetic material, e.g. steel. The first end part 152 of the bendable member 150 comprises a female part of a magnetic material. Furthermore, as is apparent in FIG. 6, the first end part 152 also comprises a sleeve means 156 arranged between the first end part 152, and the female part. This makes the connection stronger. The arrow in FIG. 6 illustrates that the member 150 is bendable.

Figure 7:
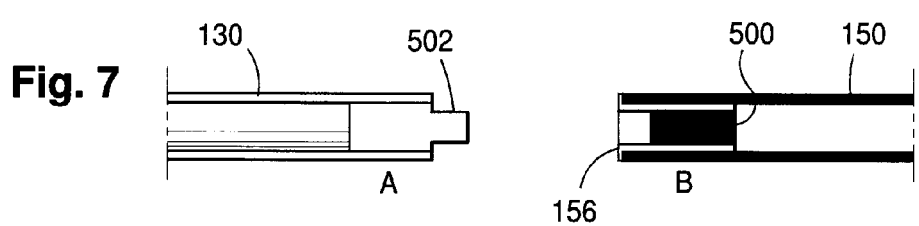
FIG. 7 is a cross section view of the parts disclosed in FIG. 6, before they have been connected.

In FIG. 7 there is disclosed a cross section view of the parts disclosed in FIG. 6, before they have been connected. In this case the female part has been assigned the reference sign 500, and the male part has been assigned the reference sign 502.

Figure 8:
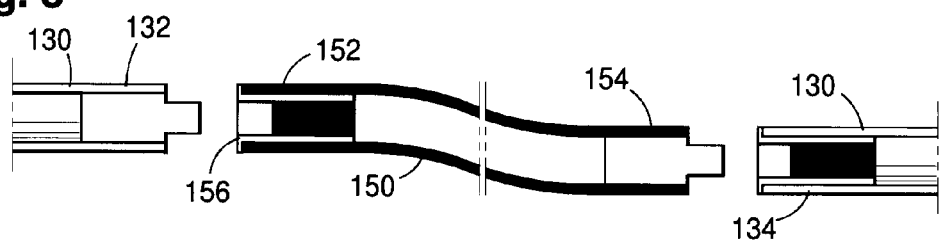
FIG. 8 is a cross section view of a first alternative of parts involved in assembling the display system disclosed in FIG. 1, or FIG. 4.

In FIG. 8 there is disclosed a cross section view of a first alternative of some parts involved in assembling the display system 100 disclosed in FIG. 1, or FIG. 4. Here are disclosed two straight members 130, and one bendable member 150. The first end part 152 of the bendable member 150 comprises a female part of a magnetic material. The second end part 154 of the bendable member 150 comprises a male part of a ferromagnetic material. To be connected to the bendable member 150 is on the one hand the straight member 130 with a male part of a ferromagnetic material arranged in the first end part 132, and on the other hand the straight member 130 with a female part of magnetic material arranged in the second end part 134.

Figure 9:
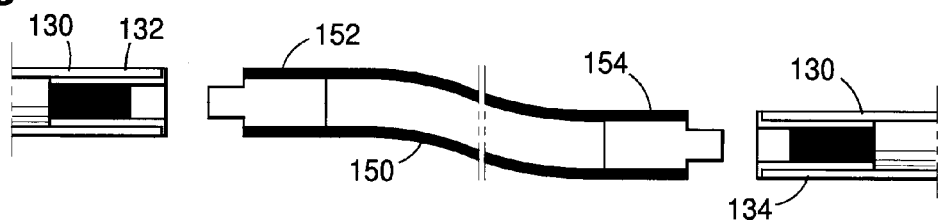
FIG. 9 is a cross section view of a second alternative of parts involved in assembling the display system disclosed in FIG. 1, or FIG. 4.

In FIG. 9 there is disclosed a cross section view of a second alternative of some parts involved in assembling the display system 100 disclosed in FIG. 1, or FIG. 4. Here are disclosed two straight members 130, and one bendable member 150. In this particular embodiment, both the first and second end parts 152, 154 of the bendable member 150 comprise a male part of a ferromagnetic material. To be connected to the bendable member 150 is on the one hand the straight member 130 with a female part of a magnetic material arranged in the first end part 132, and on the other hand the straight member 130 with a female part of a magnetic material arranged in the second end part 134.

Figure 10:
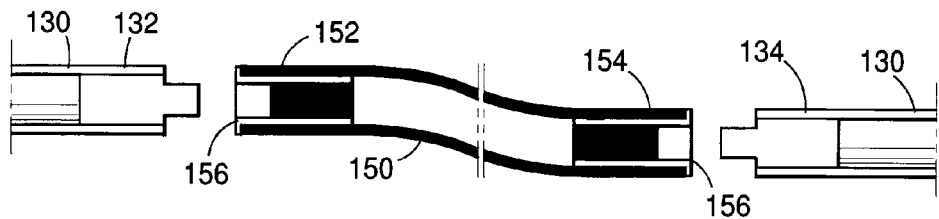
FIG. 10 is a cross section view of a third alternative of parts involved in assembling the display system disclosed in FIG. 1, or FIG. 4.

In FIG. 10 there is disclosed a cross section view of a third alternative of some parts involved in assembling the display system 100 disclosed in FIG. 1, or FIG. 4. Here are disclosed two straight members 130, and one bendable member 150. In this particular embodiment, both the first and second parts 152, 154 of the bendable member 150 comprise a female part of a magnetic material. To be connected to the bendable member 150 is on the one hand the straight member 130 with a male part of a ferromagnetic material arranged in the first end part 132, and on the other hand the straight member 130 with a male part of a ferromagnetic material arranged in the second part 134.

Figure 11:
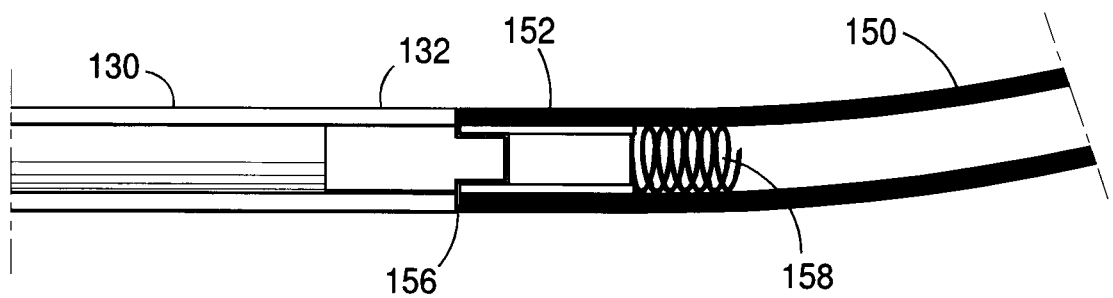
FIG. 11 is a cross section view of an alternative to the parts disclosed in FIG. 6.

In FIG. 11 there is disclosed a cross section view of an alternative to the parts disclosed in FIG. 6. Here is disclosed a bendable member 150 with a female part of a magnetic material arranged in the first end part 152, and also provided with the sleeve means 156. The bendable member 150 is connected to the straight member 130 by means of a male part of a ferromagnetic material arranged in the first end part 132. In this particular embodiment, a spring means 158 is arranged in the bendable member 150, in connection to/connected to the female part. It is pointed out that the spring means 158 also can be connected to the sleeve means 156. With this spring means 158 it is possible to achieve a curvature that is smoother. It can also be of help if the material of the bendable member 150 is too limp.

It is pointed out that the disclosed connections of different members 130, 150 are only exemplary, and not exhaustive. The different members 130, 150 can have two male parts, two female parts, or some mix of them. Furthermore, a male part can either be of a magnetic or a ferromagnetic material. The same applies for a female part. It is also possible to have magnetic materials of different polarity for a male part, and a female part to be connected.

The invention is not limited to the described embodiments. It will be evident for those skilled in the art that many different modifications are feasible within the scope of the following Claims.

The invention claimed is:

1. A collapsible, flexible display system operable to create different spatial shapes of a continuous screen, said display system comprising at least two stands, each stand comprising a first part which supports against an underlying supportive surface, wherein said stand also comprises a pole, with a first end removably secured in said first part, and a second end provided with a first coupling, and wherein said display system also comprises essentially hollow, straight members of a rigid material, each straight member comprising a first end part and a second end part, wherein said display system also comprises essentially hollow, bendable members of a flexible material, each bendable member comprising a first end part, and a second end part, wherein each of the end parts comprises either a male part, or a female part, at least one of them of a magnetic material, and operable to magnetically fasten to each other, wherein said straight members are connected to said bendable members in order to form an upper part and a lower part, both comprising one of said straight members and one of said bendable members, and if an end part of a bendable member comprises said female part, or said male part of a magnetic material, said end part of said bendable member comprises a sleeve arranged between said end part of said bendable member and said female part, or said male part, and wherein said screen comprises an upper edge welt and a lower edge welt adapted to receive said upper part and said lower part, respectively, and wherein each said pole is provided with a second coupling arranged in connection to said first end, wherein, when said display system is mounted, said upper edge welt comprising said upper part are fastened in a number, n, of first couplings, and said lower edge welt comprising said lower part are fastened in said number, n, of said second couplings.

2. A collapsible, flexible display system operable to create different spatial shapes of a continuous screen, said display system comprising at least two stands, each stand comprising a first part which supports against an underlying supportive surface, wherein said stand also comprises a pole, with a first end removably secured in said first part, and a second end provided with a first coupling, and wherein said display system comprises at least two essentially rectangular first screens, each first screen comprising two essentially hollow, straight members of a rigid material, one arranged in connection with a first short end of said first screen, and the other arranged in connection with a second short end of said first screen, each straight member comprising a first end part, and a second end part, wherein each first screen comprises a first magnetic strip arranged in connection with a first longitudinal end of said first screen, and a second magnetic strip arranged in connection with a second longitudinal end of said first screen, wherein said display system also comprises at least one essentially rectangular second screen, each second screen comprises two essentially hollow, bendable members of a flexible material, one arranged in connection with a first short end of said second screen, and the other arranged in connection with a second short end of said second screen, each bendable member comprising a first end part, and a second end part, each second screen comprising a first magnetic strip arranged in connection with a first longitudinal end of said second screen, and a second magnetic strip arranged in connection with a second longitudinal end of said second screen, wherein each of the end parts comprises either a male part, or a female part, at least one of them of a magnetic material, wherein said first and second screens are connected to each other by said straight and bendable members being connected to each other magnetically, and said magnetic strips being connected to each other magnetically, and said straight members are connected to said first coupling, and second coupling arranged in connection to said first end of each pole, creating a continuous screen.

3. The collapsible, flexible display system according to claim 2, wherein at least one of said bendable members has said first end part and said second end part provided with a female part, at least one of them being of magnetic material.

4. The collapsible, flexible display system according to claim 2, wherein at least one of said bendable members has said first end part provided with a female part, and said second end part provided with a male part, wherein at least one of said female part and said male part being of magnetic material.

5. The collapsible, flexible display system according to claim 2, wherein at least one of said bendable members has said first end part and said second end part provided with a male part, at least one of them being of magnetic material.

6. The collapsible, flexible display system according to claim 2, wherein at least one of said bendable members have at least one spring arranged in connection to said male part or female part, inside said bendable member.

7. The collapsible, flexible display system according to claim 2, wherein at least one of said straight members has said first end part and said second end part provided with a female part, at least one of them being of a ferromagnetic material.

8. The collapsible, flexible display system according to claim 2, wherein at least one of said straight members has said first end part provided with a female part, and said second end part provided with a male part, wherein at least one of said female part and said male part being of ferromagnetic material.

9. The collapsible, flexible display system according to claim 2, wherein at least one of said straight members has said first end part and said second end part provided with a male part, at least one of them being of ferromagnetic material.

10. The collapsible, flexible display system according to claim 2, wherein each of said bendable members is made of rubber.

11. The collapsible, flexible display system according to claim 2, wherein each of said straight members is made of aluminum.

12. The collapsible, flexible display system according to claim 2, wherein said straight members and said bendable members have a circular cross section.

13. The collapsible, flexible display system according to claim 2, wherein said straight members and said bendable members have an elliptical cross section.

* * * * *